No. 768,140. PATENTED AUG. 23, 1904.
T. F. ODELL.
NON-REFILLABLE BOTTLE.
APPLICATION FILED NOV. 4, 1903.
NO MODEL.

Witnesses
F. W. Riley.
Herbert D. Lawson.

Inventor
Theodore F. Odell.
By Victor J. Evans
Attorney

No. 768,140.　　　　　　　　　　　　　　　　　　Patented August 23, 1904.

UNITED STATES PATENT OFFICE.

THEODORE F. ODELL, OF NYACK, NEW YORK.

NON-REFILLABLE BOTTLE.

SPECIFICATION forming part of Letters Patent No. 768,140, dated August 23, 1904.

Application filed November 4, 1903. Serial No. 179,812. (No model.)

*To all whom it may concern:*

Be it known that I, THEODORE F. ODELL, a citizen of the United States, residing at Nyack, in the county of Rockland and State of New York, have invented new and useful Improvements in Non-Refillable Bottles, of which the following is a specification.

My invention relates to new and useful improvements in non-refillable bottles; and its object is to provide a valve of novel construction which is adapted to be inserted into the neck of the bottle and which is so formed as to prevent the admission of fluid to the bottle subsequent to the discharge of the original contents thereof.

A further object is to provide a valve which is so formed as to prevent the insertion of any objects which would hold the valve open, and thereby permit the bottle to be filled.

With the above and other objects in view the invention consists in the novel construction and combination of parts hereinafter more fully described and claimed, and illustrated in the accompanying drawings, showing the preferred form of my invention, and in which—

Figure 1:
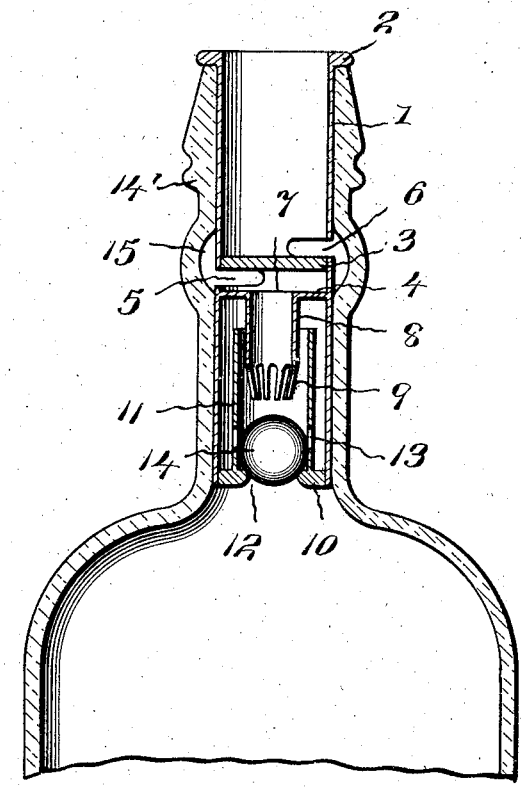
Figure 2:
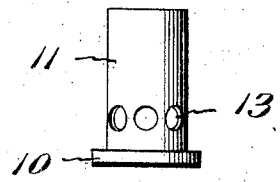

Figure 1 is a section through the neck of a non-refillable bottle constructed in accordance with my invention, and Fig. 2 is a detail view of the valve-casing detached.

Referring to the figures by numerals of reference, 1 is a tube formed of any suitable material and having a bead 2 at its upper end, adapted to bear upon the end of the bottle-neck. This tube has parallel partitions 3 and 4, respectively, and arranged between these partitions at one side of the tube is a slot 5, while within the other side of the tube and between the partition 3 and the outer end of the tube is a second slot 6. The inner partition 4 has an aperture 7 therein, which is inclosed by a depending tube 8, having arms 9 at its lower end, said arms being tapered toward each other.

Fitted within the lower end of the tube 1 is a ring 10, having a tubular valve-casing 11 extending upward therefrom and inclosing the aperture 12 within the ring. This casing has a series of apertures 13 therein, and within the casing is arranged a sphere 14, the diameter of which is substantially equal to the internal diameter of the casing 11. This sphere is normally seated by gravity upon the ring 10 and over the aperture 12.

Bottles used in connection with the valve herein described are of the ordinary construction, with the exception that the neck 14' of each bottle has an annular groove 15 therein at a point between its ends. After the bottle has been filled with liquid the tube 1, with the casing 11 therein, is inserted into the neck, and after it has been placed in proper position therein the slots 5 and 6 will be in alinement with the groove 15. When it is desired to discharge the contents of the bottle, the same is inverted, and the sphere 14 will roll longitudinally within the casing 11 and come in contact with the arms 9. The liquid will then flow downward through the apertures 12 and 13 and thence around the inner end of the casing 11 between the arms 9 and through the tube 8 to the slot 5. From this slot the fluid will flow around the groove 15 through the slot 6 and out of the end of tube 1. As the sphere 14 seats by gravity upon the ring 10, it is obvious that the bottle cannot be filled after the original contents thereof have been discharged unless the tube is removed. This, however, is prevented by cementing the tube within the bottle-neck or securing it in any other suitable manner.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. The combination with a bottle-neck; of a tube in the neck having slots therein, a partition in the tube and adjacent the slots, an apertured valve-casing in the tube and below the partition, a ball-valve in the casing, and means for limiting the movement of the valve.

2. The combination with a bottle having an internally-grooved neck; of a tube arranged within the neck and having slots at opposite sides thereof opening into the groove, a partition within the tube and between the slots, an apertured valve-casing within the tube below the partition, a ball-valve within the casing, and means for limiting the movement of the valve.

3. The combination with a bottle having an internally-grooved neck; of a casing within the neck and having slots in opposite sides thereof opening into the groove, a partition within the tube and between the slots, a second partition within the tube and below the slots, said second partition having an aperture therein, and a tube inclosing the aperture and depending from the lower partition, arms extending from the tube, an apertured valve-casing within the first-mentioned tube and inclosing the arms and their tube, and a ball-valve within the casing.

In testimony whereof I affix my signature in presence of two witnesses.

THEODORE F. ODELL.

Witnesses:
O. F. THEIS,
J. T. GILCHRIST.